US007119832B2

(12) United States Patent
Blanco et al.

(10) Patent No.: US 7,119,832 B2
(45) Date of Patent: Oct. 10, 2006

(54) WIRELESS MICROPHONE FOR USE WITH AN IN-CAR VIDEO SYSTEM

(75) Inventors: Louis W. Blanco, Boonton, NJ (US); Leo Lorenzetti, Hardyston, NJ (US)

(73) Assignee: L-3 Communications Mobile-Vision, Inc., Boonton, NJ (US)

( * ) Notice: Subject to any disclaimer, the term of this patent is extended or adjusted under 35 U.S.C. 154(b) by 756 days.

(21) Appl. No.: 09/911,086

(22) Filed: Jul. 23, 2001

(65) Prior Publication Data

US 2003/0016834 A1 Jan. 23, 2003

(51) Int. Cl.
*H04N 7/18* (2006.01)
*H04B 1/00* (2006.01)
*H44R 1/02* (2006.01)

(52) U.S. Cl. ..................................................... 348/148

(58) Field of Classification Search .................. 381/86, 381/91, 122, 365; 348/148, 143, 158; 455/88, 455/92, 68, 352, 343.2, 345, 95, 421; 340/426.16, 340/426.17, 573.1, 441; 375/130, 132, 140; H04N 7/18; H04B 1/00; H04R 1/02
See application file for complete search history.

(56) References Cited

U.S. PATENT DOCUMENTS 4,789,904 A 12/1988 Peterson ..................... 358/310
4,873,711 A * 10/1989 Roberts et al. .......... 455/412.2
4,949,186 A * 8/1990 Peterson ..................... 386/107
5,012,335 A * 4/1991 Cohodar ..................... 348/158
5,111,289 A * 5/1992 Lucas et al. ................ 348/148
5,491,464 A * 2/1996 Carter et al. ............. 340/425.5
5,515,042 A 5/1996 Nelson ....................... 340/937
5,568,510 A * 10/1996 Tam .......................... 375/134
5,617,086 A 4/1997 Klashinsky et al. ........ 340/907
5,677,979 A 10/1997 Squicciarini et al. ......... 386/46
5,764,685 A * 6/1998 Tanaka et al. .............. 375/130

(Continued)

FOREIGN PATENT DOCUMENTS

JP 05-183788 A 7/1993

(Continued)

OTHER PUBLICATIONS

Spread Spectrum Technology and Wireless Microphone Systems. Lectrosonics, Inc. [online] Apr. 4, 1996 [retrieved Nov. 22, 2004]. Retrieved from the Internet: <URL: http://www.lectrosonics.com/WPapers-Magazines/ss.pdf>.*

*Primary Examiner*—Tung Vo
(74) *Attorney, Agent, or Firm*—Mark K. Young, Esq.; Stuart H. Mayer, Esq.

(57) ABSTRACT

An in-car video system and method is provided where a wireless microphone is configured with bi-directional communications capability. In response to a received RF activation signal, the wireless microphone is automatically switched on to capture (and transmit back to the in-car video system) an audio soundtrack that accompanies the images captured by the car-mounted video camera. A wireless microphone controller mounted in the car transmits the RF activation signal to the wireless microphone. The wireless microphone controller is arranged to transmit the RF activation signal when the video recording device starts recording. In an illustrative embodiment of the invention, the wireless microphone receives information, including a confirmation that the video recording device is recording, from an RF information signal received from the wireless microphone controller mounted in the car. The wireless microphone displays the information to the officer on a display screen. The wireless microphone sounds an audible alert when it receives the RF activation or information signals.

11 Claims, 8 Drawing Sheets

U.S. PATENT DOCUMENTS

| | | | | |
|---|---|---|---|---|
| 5,794,125 | A * | 8/1998 | Grad | 340/636.1 |
| 5,794,164 | A | 8/1998 | Beckert et al. | 701/1 |
| 5,812,056 | A | 9/1998 | Law | 340/539 |
| 5,938,717 | A | 8/1999 | Dunne et al. | 701/117 |
| 6,002,326 | A | 12/1999 | Turner | 340/426 |
| 6,037,977 | A | 3/2000 | Peterson | 348/148 |
| 6,181,373 | B1 | 1/2001 | Coles | 348/158 |
| 6,211,907 | B1 | 4/2001 | Scaman et al. | 348/148 |
| 6,262,764 | B1 * | 7/2001 | Perterson | 348/148 |
| 6,275,773 | B1 | 8/2001 | Lemelson et al. | 701/301 |
| 6,346,890 | B1 | 2/2002 | Bellin | 340/825.52 |
| 6,389,340 | B1 | 5/2002 | Rayner | 701/35 |
| 6,469,735 | B1 | 10/2002 | Coles | 348/158 |
| 6,487,500 | B1 | 11/2002 | Lemelson et al. | 701/301 |
| 6,518,881 | B1 | 2/2003 | Monroe | 340/539 |
| 6,542,076 | B1 | 4/2003 | Joao | 340/539 |
| 6,542,077 | B1 | 4/2003 | Joao | 340/539 |
| 6,574,314 | B1 | 6/2003 | Martino | 379/93.17 |
| 6,587,046 | B1 | 7/2003 | Joao | 340/539.14 |
| 6,587,152 | B1 * | 7/2003 | Sharp et al. | 348/373 |
| 6,675,006 | B1 | 1/2004 | Diaz et al. | 455/404.1 |
| 6,681,195 | B1 | 1/2004 | Poland et al. | 702/142 |
| 6,683,526 | B1 | 1/2004 | Bellin | 340/3.43 |
| 6,696,978 | B1 | 2/2004 | Trajkovic et al. | 340/936 |
| 2001/0001561 | A1 | 5/2001 | Coles | 348/158 |
| 2001/0010490 | A1 | 8/2001 | Bellin | 340/7.46 |
| 2001/0034768 | A1 | 10/2001 | Bain | 709/206 |
| 2002/0003571 | A1 | 1/2002 | Schofield et al. | 348/148 |
| 2002/0036565 | A1 | 3/2002 | Monroe | 340/425.5 |
| 2002/0041240 | A1 | 4/2002 | Ikeda | 340/993 |
| 2002/0095601 | A1 | 7/2002 | Hind et al. | 713/201 |
| 2002/0101509 | A1 | 8/2002 | Slomski | 348/143 |
| 2002/0121969 | A1 | 9/2002 | Joao | 340/425.5 |
| 2002/0131768 | A1 | 9/2002 | Gammenthaler | 386/107 |
| 2003/0008662 | A1 | 1/2003 | Stern et al. | 455/456 |
| 2003/0016130 | A1 | 1/2003 | Joao | 340/539 |
| 2003/0016834 | A1 | 1/2003 | Blanco et al. | 381/91 |
| 2003/0036825 | A1 | 2/2003 | Kim | 701/1 |
| 2003/0052970 | A1 | 3/2003 | Dodds et al. | 348/148 |
| 2003/0067541 | A1 | 4/2003 | Joao | 348/148 |
| 2003/0067542 | A1 | 4/2003 | Monroe | 348/148 |
| 2003/0071899 | A1 | 4/2003 | Joao | 348/148 |
| 2003/0080713 | A1 | 5/2003 | Kirmuss | 320/150 |
| 2003/0080878 | A1 | 5/2003 | Kirmuss | 340/936 |
| 2003/0081121 | A1 | 5/2003 | Kirmuss | 348/143 |
| 2003/0081122 | A1 | 5/2003 | Kirmuss | 348/148 |
| 2003/0081123 | A1 | 5/2003 | Rupe | 348/148 |
| 2003/0081127 | A1 | 5/2003 | Kirmuss | 348/207.99 |
| 2003/0081128 | A1 | 5/2003 | Kirmuss | 348/207.99 |
| 2003/0081934 | A1 | 5/2003 | Kirmuss | 386/46 |
| 2003/0081935 | A1 | 5/2003 | Kirmuss | 386/46 |
| 2003/0086000 | A1 | 5/2003 | Siemens et al. | 348/148 |
| 2003/0087636 | A1 | 5/2003 | Mazzara et al. | 455/426 |
| 2003/0095688 | A1 | 5/2003 | Kirmuss | 382/105 |
| 2003/0112929 | A1 | 6/2003 | Chuang | 379/88.13 |
| 2003/0151663 | A1 | 8/2003 | Lorenzetti et al. | 348/148 |
| 2003/0159044 | A1 | 8/2003 | Doyle et al. | 713/176 |
| 2003/0185296 | A1 | 10/2003 | Masten, Jr. | 375/240.01 |
| 2003/0193404 | A1 | 10/2003 | Joao | 340/825.71 |
| 2003/0206102 | A1 | 11/2003 | Joao | 340/539.1 |
| 2003/0210328 | A1 | 11/2003 | Mazzilli | 348/148 |
| 2003/0218551 | A1 | 11/2003 | Crocker et al. | 340/905 |
| 2003/0221118 | A1 | 11/2003 | Walker | 713/193 |
| 2003/0229900 | A1 | 12/2003 | Reisman | 725/87 |
| 2004/0008253 | A1 | 1/2004 | Monroe | 348/143 |
| 2004/0008255 | A1 | 1/2004 | Lewellen | 348/148 |
| 2004/0013192 | A1 | 1/2004 | Kennedy | 375/240 |
| 2004/0031058 | A1 | 2/2004 | Reisman | 725/112 |
| 2004/0036601 | A1 | 2/2004 | Obradovich | 340/540 |
| 2004/0059582 | A1 | 3/2004 | Kumhyr | 704/275 |
| 2004/0070515 | A1 | 4/2004 | Burkley et al. | 340/825.49 |
| 2004/0075547 | A1 * | 4/2004 | Vojtech et al. | 340/500 |
| 2004/0109059 | A1 | 6/2004 | Kawakita | 348/143 |
| 2004/0145457 | A1 | 7/2004 | Schofield et al. | 340/425.5 |
| 2004/0146272 | A1 | 7/2004 | Kesel et al. | 386/46 |
| 2004/0150717 | A1 | 8/2004 | Page et al. | 348/148 |
| 2004/0155781 | A1 | 8/2004 | DeOme | 340/573.1 |
| 2004/0160319 | A1 | 8/2004 | Joao | 340/539.1 |
| 2004/0177253 | A1 | 9/2004 | Wu et al. | 713/176 |
| 2004/0189803 | A1 | 9/2004 | Price | 348/151 |
| 2004/0192353 | A1 | 9/2004 | Mason et al. | 455/457 |
| 2004/0201765 | A1 | 10/2004 | Gammenthaler | 348/333.01 |

FOREIGN PATENT DOCUMENTS

JP 05183788 A * 7/1993

* cited by examiner

WIRELESS MICROPHONE FOR USE WITH AN IN-CAR VIDEO SYSTEM

BACKGROUND OF THE INVENTION

This invention is related generally to surveillance systems, and more particularly to a wireless microphone for use with an in-car video system.

Vehicle-mounted surveillance systems, also termed in-car video systems, are seeing increased use in the security industry and law enforcement community as an effective means to provide an indisputable video and audio record of encounters involving officers and citizens. In these systems, a video camera is typically mounted on the police car's dashboard or windshield and is generally arranged to have a field of view of the area to the immediate front of the car. The field of view approximately corresponds to what an officer would see when seated in the car's front seat.

The video camera is operably coupled to a recording device, such as a video cassette recorder ("VCR"), mounted in the police car, often in the trunk. A videotape recording may be started manually by the officer, or in some systems, the videotaping is started automatically when, for example, the officer activates the police car's emergency systems (such as overhead lights and/or sirens), or when a vehicle speed-measuring radar unit is operated.

In some in-car video systems, the VCR may start recording when the officer activates the wireless microphone. Security schemes may also be used where the VCR starts recording only when it receives a predetermined code at a certain RF frequency from the wireless microphone. Inadvertent triggering from stray RF signals is thus avoided. A visual indicator to verify that a videotape recording is being made may be displayed on an indicating device mounted on the car (such as a light in the car's front grill or windshield) that can be seen by the officer at a distance (for example, when the officer is located in the proximity of a stopped car).

In-car video systems serve to enhance prosecution of traffic, DWI/DUI and controlled dangerous substances offenses (to name just a few) by contributing detailed graphical and auditory evidence in a time-sequential manner that is inherently unbiased and objective. Such evidence is a valuable adjunct to eyewitness and officer testimony. In addition, as with other quality-improvement initiatives where conduct is surveyed and recorded, in-car video system usage has been shown to assist in the maintenance of high professional standards among law enforcement personnel. Police-community relations have improved and citizen complaints of police misconduct have lessened in many jurisdictions where in-car video systems are used, often as a result of the inherently high-quality evidence provided by such systems. Videos taken with in-car video systems are also valuable training aids to law enforcement personnel.

Videotape evidence is protected (and the evidentiary chain of custody readily established) because the video cassette recorder and video recording medium (i.e., videotape) are typically "locked", often both mechanically and electronically, within a tamperproof security enclosure in the car that is only accessible by law enforcement command personnel. In addition, the in-car systems are configured to prevent erasure or over-recording of a recorded encounter to ensure the integrity of the videotaped evidence. In-car video systems may superimpose time and date stamps on the recorded video image as a further enhancement to the evidentiary strength of the videotape.

In-car video systems generally employ a wireless microphone carried on the person of a law enforcement officer to record an audio soundtrack that accompanies the visual scene captured on videotape. The audio soundtrack is an extremely valuable complement to the recorded video because it acts as a transcript of the what was said, by whom and when. In some cases, the audio soundtrack is more valuable as evidence than the visual record because issues pertaining to consent, admissions, and state-of-mind of the suspect and/or officer (to cite just a few examples) may be resolved more effectively by the audio record. In some systems, additional wired microphones may be deployed in other locations within the car, such as the rear-seat passenger area, to record sounds and conversations emanating from those locations.

While current in-car video systems perform very well in many applications, there have been instances where officers have inadvertently failed to turn on the wireless microphone during an encounter or traffic stop even though the videotaping may be properly activated. Thus, a valuable piece of the evidentiary record is lost. Additionally, while car-mounted visual recording status indicators are very satisfactory in most situations, there may be times when the car-mounted indicator is out of the line of sight of the officer, or is obscured by weather conditions. Lost or damaged wireless microphones may also present a logistical challenge to some departments since each wireless microphone must be matched to a particular in-car video system in some systems in order to enable secure transmission from the wireless microphone.

SUMMARY OF THE INVENTION

An in-car video system and method is provided where a wireless microphone is configured with bi-directional RF communications capability. In response to a received RF activation signal, the wireless microphone is automatically switched on to capture (and transmit back to the in-car video system) an audio soundtrack that accompanies the visual images captured by the car-mounted video camera. A wireless microphone controller mounted in the car transmits the RF activation signal to the wireless microphone. The wireless microphone controller is arranged to transmit the RF activation signal when the VCR starts recording.

In an illustrative embodiment of the invention, the wireless microphone receives information, including a confirmation that the VCR is recording, from an RF information signal received from the wireless microphone controller mounted in the car. The wireless microphone displays the information to the officer on a display screen. The wireless microphone sounds an audible alert when it receives the RF activation or information signals. The wireless microphone controller is arranged to send an RF deactivation signal to the wireless microphone when the VCR stops recording.

In another illustrative embodiment of the invention, the wireless microphone and wireless microphone controller are arranged in a docking configuration where a security code is exchanged between them during a synchronization process. When the wireless microphone is subsequently un-docked from the microphone controller, the security code is used to provide secure RF transmission back to the microphone controller using the code exchanged during the synchronization process. In a preferred embodiment of the invention, the code exchanged during synchronization comprises the frequency spreading code used in the inherently-secure, digital spread spectrum ("DSS") RF transmission stream utilized by the wireless microphone at a nominal frequency of 900 MHz. The wireless microphone controller uses the code to de-spread the received RF transmission to construct an information stream representing the audio captured by the wireless microphone.

Advantageously, the invention ensures that a complete evidentiary record is established, including the audio soundtrack, without requiring the officer to remember to turn on the wireless microphone during an encounter or traffic stop (which can very often be highly stressful situations). By utilizing the bi-directional communications capabilities of the present inventive arrangement, the wireless microphone may be activated automatically, for example, when the VCR starts recording upon activation of the car's emergency lights. Information displayed on a screen incorporated into the wireless microphone (including, for example, a VCR recording confirmation) and audible alerts provide the officer with valuable in-car video system status even when the visual indicators mounted on the patrol car are out of sight or otherwise obscured.

In addition, the docking and synchronization arrangement of the present invention advantageously reduces the administrative burden on police department when managing in-car video equipment. Unlike conventional in-car systems where a specific microphone must be matched to a specific video system in the patrol car (to ensure that the transmitter and receiver use the same security code), the inventive synchronization process allows any wireless microphone in the equipment pool to work with any in-car video equipped vehicle in the department's fleet.

In accordance with one aspect of the invention, a vehicle-mounted base station is provided in a vehicle-mounted video surveillance system that includes a recording device. The base station is used with a wireless microphone that is operational-mode switchable in response to an RF activation signal. The base station includes an input coupled to receive an operational status signal from the video surveillance system indicative of an operational status of the recording device. The base station also includes a controller coupled to the input to receive the operational status signal and for generating an RF activation signal when the operational status signal indicates that the recording device is in a recording mode. The base station further includes an RF transmitter arranged for transmitting the RF activation signal to the wireless microphone to switch the wireless microphone into a transmit mode from a standby mode.

DETAILED DESCRIPTION

Figure 1:
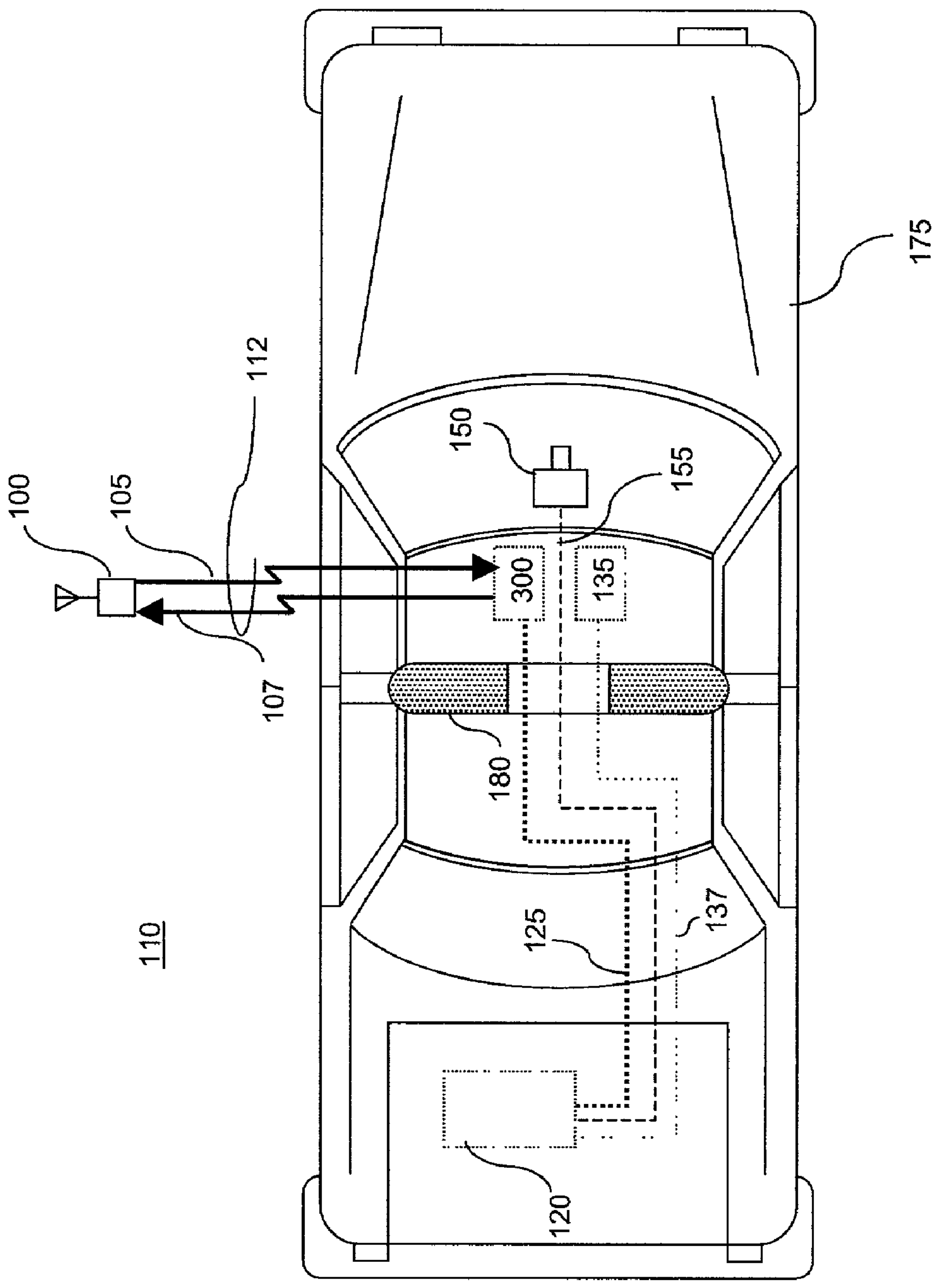
FIG. 1 is a simplified functional block diagram of an illustrative arrangement of the present invention depicting an in-car video surveillance system (including a windshield mounted camera and trunk-mounted VCR), a car-mounted wireless microphone controller, and wireless microphone equipped with bi-directional RF communications capability.

Referring to FIG. 1, there is depicted a simplified functional block diagram of an illustrative arrangement of the present invention depicting an in-car video surveillance system 110 (including a windshield mounted camera 150 and trunk-mounted VCR 120), a car-mounted wireless microphone controller 300, and wireless microphone 100 equipped with bi-directional RF communications capability. Vehicle 175 is depicted in FIG. 1 as a police cruiser with emergency lightbar 180, however it is emphasized that the features and benefits of the present invention may be equally applicable to a wide variety of vehicle types, and further that the invention is not limited to law enforcement applications. Applications of the invention to the security and the transportation industries may be readily made, for example. Therefore, the term "officer" in the description that follows should be understood to refer to the user or operator of the inventive in-car video system in non-law enforcement applications.

VCR 120, as shown in FIG. 1, is typically located in secure enclosure contained in the trunk of the car. The enclosure is generally quite rugged, both to provide deterrents against tampering or improper access to the videotape, and also to protect the tape in the event that the vehicle 175 is involved in a crash. The enclosure may also be environmentally controlled to keep the VCR 120 and videotape within acceptable operating conditions. VCR is operably coupled to wireless microphone controller 300 by bus 125, as shown in FIG. 1. It is noted that VCR 120 is merely representative of any of a number of recording devices that are arranged to record video and audio, either as a single device or a combination of devices. Such recording devices include those that record on tape as well as those that use other media, such magnetic media (including disk-drives and cartridge drives), electronic media (including volatile and non-volatile memory), and optical media (including optically writeable disks).

A remote VCR control head 135 is located in vehicle 175 near the driver and is operably coupled to VCR 120 via bus 137 to allow the VCR to be conveniently controlled by the officer from within the vehicle. VCR control head 135 may be arranged with typical controls such as "POWER", "RECORD", "STOP", "REWIND", "PLAY", and "FORWARD" buttons which operate the VCR 120 accordingly.

Camera 150 may be selected from the wide variety of available cameras. Preferably, camera 150 is a compact camera (to reduce the likelihood of obstructing the officer's view out the windshield) with color capabilities such as a solid-state CCD ("charge-coupled device") camera that can operate in low-light environments. Camera 150 may be optionally configured with digital and/or optical zoom capabilities. Camera 150, in this illustrative arrangement, is mounted to the windshield of vehicle 175, however other mounting locations may be used in other applications. Camera 150 is operably coupled to VCR 120 via bus 155.

Wireless microphone 100 is depicted in FIG. 1 to be located outside of vehicle 175. Such location is merely illustrative as wireless microphone 100 is most often carried on the person of the officer, and thus, may be located both inside and outside of the vehicle 175 at any given time. Wireless microphone 100, in accordance with the invention, is equipped with bi-directional RF communications capabilities. That is, wireless microphone 100 is configured to transmit an RF data signal (over wireless path 105 in FIG. 1) and receive RF signals (over wireless path 107), including information and controls signals as described more fully below. A bi-directional RF communications stream 112 is thus formed by the combination of wireless path 105 and wireless path 107.

Wireless microphone controller 300, like VCR 120 and camera 150, is mounted in vehicle 175. While shown as a discrete unit in FIG. 1, in some applications of the invention it may be desirable to incorporate the features and functions of wireless microphone controller 300 into other equipment mounted in the vehicle, including equipment that is typically part of the in-car video system (such as a video monitor which is not shown in FIG. 1). Alternatively, wireless microphone controller functionality may be incorporated into other equipment such as radios and other communications equipment that is typically installed in law enforcement patrol vehicles.

Figure 2:
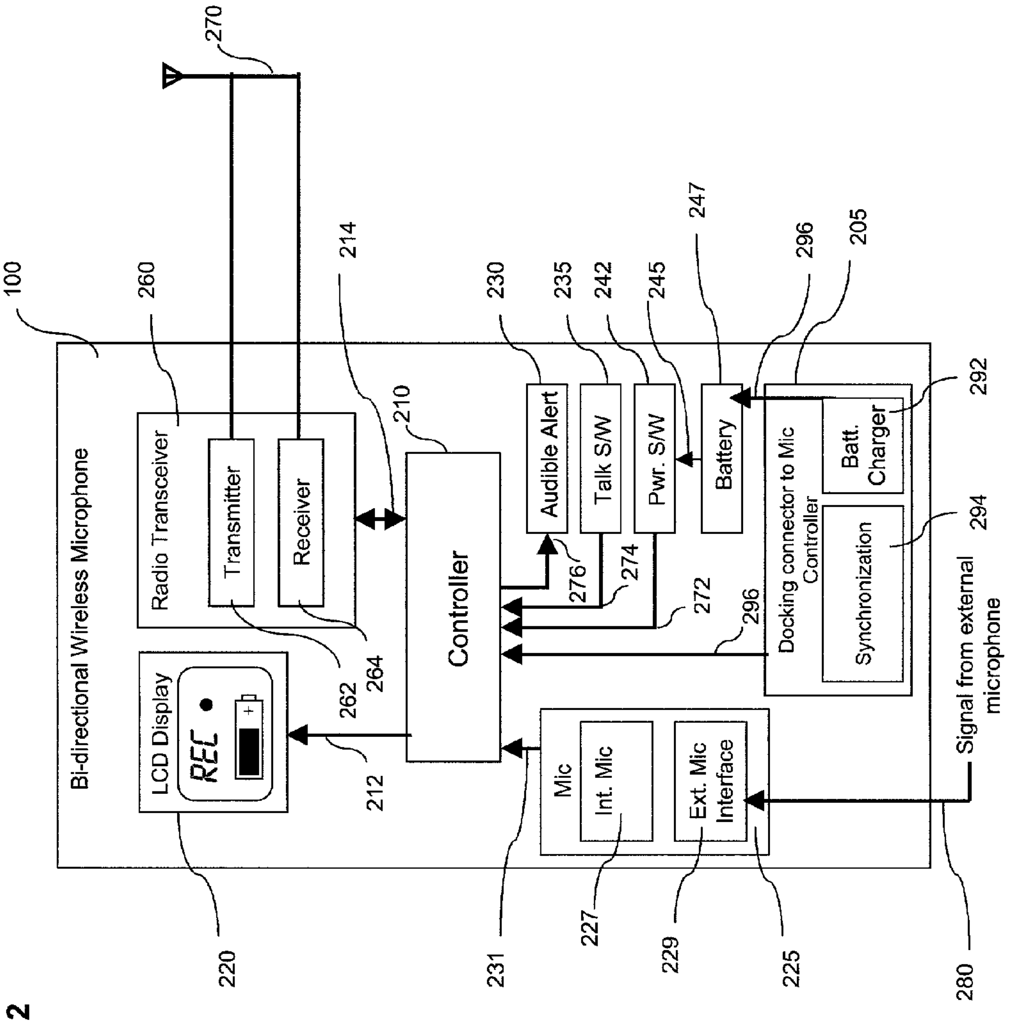
FIG. 2 is a simplified functional block diagram of the wireless microphone of FIG. 1.

Referring now to FIG. 2, there is depicted a simplified functional block diagram of the wireless microphone 100. As indicated in FIG. 2, wireless microphone is bi-directional as that term is defined above. Accordingly, radio transceiver 260 comprises both an RF transmitter 262 and RF receiver 264. RF transmitter 262 may be selected to use any number of conventional radio transmission methodologies. However, in many applications, a secure transmission stream is desirable. Thus, in this illustrative arrangement, an FCC Rules Part 15 compliant spread spectrum transmission technique is utilized in the 902–928 MHz band. Both frequency hopping and direct sequence spreading methods (i.e., coding schemes) may be used.

While spread spectrum RF modulation is well known, briefly, spread spectrum systems use two modulation processes—a conventional form of modulation (which may be digital or analog) to impress data onto the transmission stream, and RF carrier modulation by the spreading code causing the RF carrier spread over a large bandwidth. Spread spectrum modulation advantageously provides excellent resistance to interference and unwanted detection by unauthorized personnel because non-spread signals are rejected by the spread spectrum receiver while other radio receivers (without the spreading code) are unable to recover the data signal from the RF transmission stream.

Antenna 270 is coupled to radio transceiver 260, as shown in FIG. 2. Both external and internal antennae may be used as required by the specific applications.

Radio transceiver 260 is coupled to controller 210 via bus 214. Controller 210 may be arranged from discrete circuits, general purpose integrated circuits, and application-specific integrated circuits ("ASICs"). In this illustrative arrangement, controller 210 is an ASIC that includes the spread spectrum engine and performs all the usual control and monitoring functions necessary to implement a bi-directional wireless microphone.

Controller 210 sends an information signal via bus 212 to LCD display 220. While an LC ("liquid crystal") display is shown in FIG. 2, other displays including light emitting diode ("LED") arrays and other conventional display technologies may also be used in some applications. LCD display 220 is arranged to display status information relating the in-car video system 110 (FIG. 1), as well as status information relation to the wireless microphone 100. FIG. 2 shows several illustrative status indicators, including the word "REC" plus a round icon to indicate that VCR 120 (FIG. 1) is recording. A battery icon is also displayed to indicate the current battery level of wireless microphone 100 (where a higher battery charge would correspond to a larger percentage of the battery icon being displayed in black on LCD display 220). However, these status indicators are merely exemplary, and other indicators may be selected.

Wireless microphone 100 includes an analog microphone module 225. Analog microphone module 225 is operably coupled to controller 210 via bus 231. Analog microphone module 225 includes an internal microphone 227 and an interface 229 for an external microphone which include corded microphones such as lavaliere microphones. The signal from the external microphone is received at interface 229 on line 280, as shown in FIG. 2.

In some applications of the invention, it may be desirable to use only an internal microphone or external microphone, but not both. However, an internal microphone provides a back-up in case the external microphone fails, for example, by an electrical break in the cord or damage to the external microphone element itself. Omni-directional condenser microphones may often provide the best performance in many applications and may be used for both internal and external microphones.

An analog sound signal corresponding to the audio captured by the microphone module 225 is sent to the controller 210 on bus 231. Controller 210 performs an audio encoding function to convert the analog sound signal received from microphone module 225 into a digital signal. In some applications, a discrete, dedicated audio codec (i.e., digital-analog coder/decoder) may be preferred.

Wireless microphone 100 includes battery 247. In this illustrative arrangement of the invention, battery 247 comprises a rechargeable battery pack, however non-rechargeable (i.e., single use or disposable) batteries may be also be used. Nickel-cadmium ("Ni—CAD"), nickel-metal hydride ("NiMH") and lithium Ion ("LiOn") are all suitable rechargeable battery types, although LiOn provides the highest performance (longest discharge time with quickest recharge time and greatest number of discharge/charge cycles) in most applications. LiOn batteries may be particularly well suited to applications, including the present inventive application, where a reliable power source is needed. LiOn batteries do not suffer from the so-called "memory effect" which limits the of charge capacity of other battery types when they are discharged repeatedly and then recharged before they have fully drained.

Audible alert generator 230 is operably coupled to controller 210 with bus 276. Audible alert generator 230 is a device, such as tone generator, buzzer or ringer, that is used to direct the officer's attention to the LCD display 220 or otherwise indicate to the officer that an action has occurred. For example, the audible alert generator 230 may sound to indicate a low battery level in wireless microphone 100, or that the wireless microphone 100 is out of radio range with the in-car video system 110 (FIG. 1), or to provide a confirmation to the officer that VCR 120 is recording. Audible alert generator 230 may be configured to sound distinctive tones that correspond to the various alerts. LCD display 220 may be arranged to display a visual alert corresponding to the audible alert, such as a flashing battery icon or the term "BAT" in the case of low battery level, "NO SIGNAL" in the case of an out of range condition, or "REC" in the case of record confirmation.

Power switch 242 is disposed between battery 247 and controller 210 with bus 272 and bus 245, respectively. Power switch 242 is user-operable to switch battery power on and off to wireless microphone 100.

Talk switch 235 is a user-operable switch that switches wireless microphone 100 into transmit mode (i.e., "talk" mode) where audio captured by microphone module 225 is digitized by controller 210 and transmitted by radio transceiver 260 to the wireless microphone controller 300. As described in more detail below, talk switch 235 is used by the officer to switch wireless microphone 100 into "talk" mode, but it may be arranged so that it is not usable as a means to switch the wireless microphone out of "talk mode" (i.e., back into a standby mode of operation) when VCR 120 (FIG. 1) is recording.

A docking connector 205 is provided in wireless microphone 100 as shown in FIG. 2. Docking connector 205 is arranged to provide a interface with wireless microphone controller 300 to enable the docking and synchronization features (described more fully below) using synchronization port 294. Docking connector 205 also includes a battery charger port 292 that allows current to flow on bus 296 to battery 247 from an external battery charger (such as battery charger 392 depicted in FIG. 3).

Figure 3:
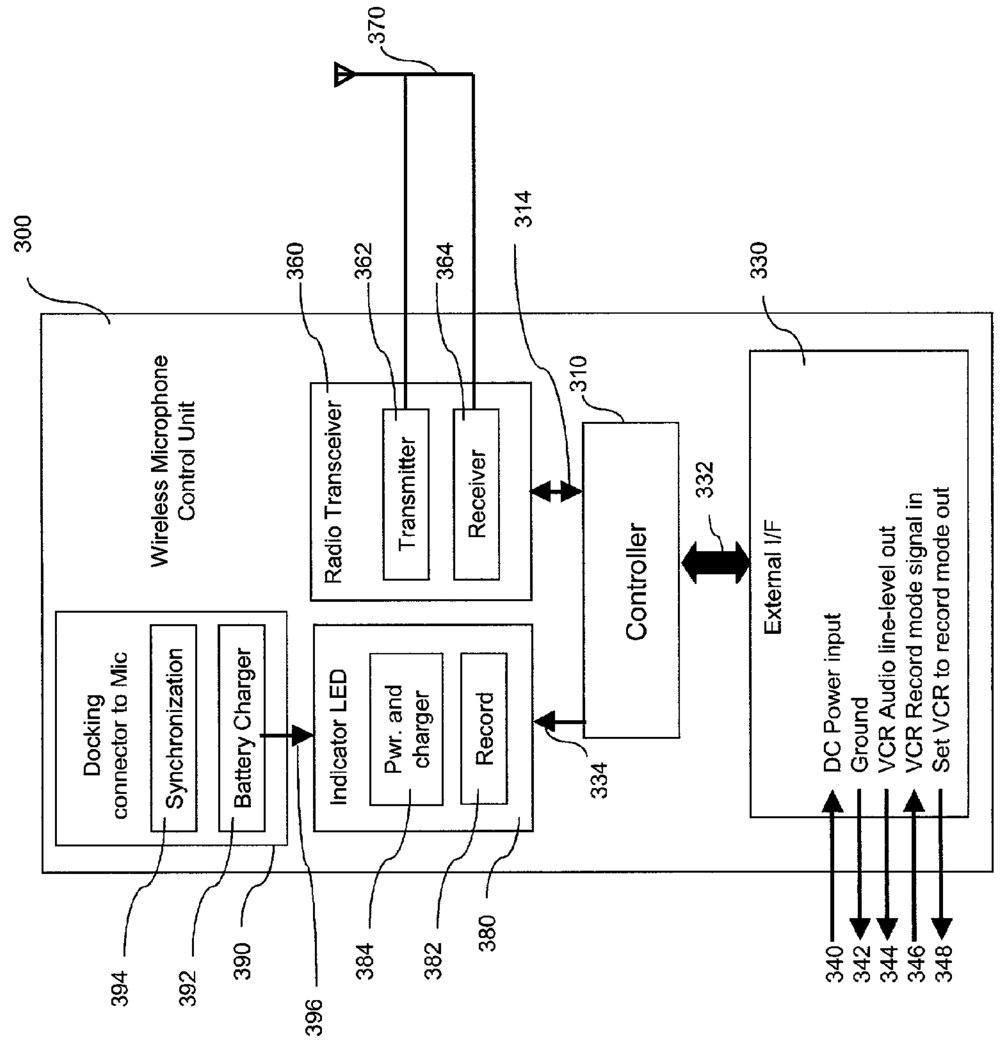
FIG. 3 is a simplified functional block diagram of the wireless microphone controller of FIG. 1.

Referring now to FIG. 3, there is depicted a simplified functional block diagram of the microphone controller 300 arranged in accordance with the invention. Microphone controller 300 performs as the functional interface with wireless microphone 100 to the in-car video system 110. Microphone controller 300 is arranged to share the bi-directional RF communications stream 112 with wireless microphone 100, and is thus equipped with a radio transceiver 360 which may be similar in form and function to the radio transceiver 260 in FIG. 2. As wireless microphone controller 300 is an interface between the RF domain (with wireless microphone 100) and the wired domain (with VCR 120), it may also be termed an audio "base station" in the in-car video system 110

Wireless transceiver 360 includes an RF transmitter 362 and RF receiver 364, as shown in FIG. 3. The RF transmitter 362 is used to send RF activation and RF deactivation signals to the wireless microphone 100 (to switch it between standby and "talk" modes), as described in greater detail below. RF transmitter 362 and RF receiver 364 are selected to be functionally complementary to RF transmitter 262 and RF receiver 264 (FIG. 2) in wireless microphone 100. Therefore, in the illustrative embodiment of the invention depicted in FIG. 3, a spread spectrum transceiver operating at a nominal frequency of 900 MHz is used in wireless microphone controller 300.

An antenna 370 is coupled to wireless transceiver 360, as shown in FIG. 3. Because the bi-directional RF communications stream 112 may be imbalanced (i.e., wireless microphone 100 transmits relatively more data over wireless link 105 to wireless microphone controller 300 than it receives over wireless link 107), it may be advantageous to configure antenna 370 externally to wireless microphone controller 300 to present a strong signal to RF receiver 364. However, an internally-configured antenna may also be used.

Radio transceiver 360 is operably coupled to controller 310 via bi-directional bus 314. Controller 310 may be similar in form and operation to controller 210 shown in FIG. 2. Controller 310 includes an audio codec and spread spectrum engine to take the signal from radio transceiver 360 on bus 314, de-spread the signal to remove the effects of the spreading code and recover the digital information from the received RF signal. Controller 310 additionally decodes the digital information into a corresponding analog signal which is provided to the external interface ("I/F") 330 on bi-directional bus 332, as shown in FIG. 3. As with controller 210, a discrete audio codec may be preferred in some applications of the invention. The analog signal is presented to the VCR 120 via a connection in the external I/F 330 depicted by line 344. It is noted that some signal conditioning, such as voltage rectification, and signal phase and amplitude adjustments, may be required in some applications which may be performed by conventional circuits (not shown in FIG. 3).

External I/F 330 provides inputs and outputs to and from wireless microphone controller 300 to devices in the in-car video system 110 that are external to the wireless microphone controller. Specifically, as depicted in FIG. 3, DC power (typically 12V from the electrical system of vehicle 175) is received on line 340. Ground is provided on line 342. The VCR line-level output signal is provided on line 344. A signal indicative that the VCR 110 is recording is received on line 346.

A command signal to switch the VCR 120 to record mode is output on line 348. If the VCR 120 is not already recording, the wireless microphone controller 300 sends the command signal to start the recording when the officer activates the talk switch 235 and the RF transmission stream from wireless microphone 100 is received by the wireless microphone controller. Thus, the officer is able to remotely activate the in-car video system 120 manually by actuating a single switch (i.e., talk switch 235).

Controller 310 is operably coupled to indicator LED 380 on bus 334. Controller 310, in response to the indicative signal received from VCR 120 on line 346, sends a signal to a visual recording status indicator 382. While an LED is depicted in this illustrative arrangement, other indicator devices may be used including lasers, and incandescent or fluorescent sources. Recording status indicator 382 is operated to provide a visual indication that the VCR 120 is recording at the wireless microphone controller 300 which is mounted inside vehicle 175.

A power and/or charging indicator 384 is also provided. Indicator 384 may be similar in form and function to indicator 382 and provides a visual indicator at the wireless microphone controller 300 that it is powered-on, and as described below, may be arranged (alone or in combination with the power-on status function) provide the charging status of the wireless microphone 100 when it is docked with the wireless microphone controller in accordance with the invention. The charging status is displayed on indicator 384 in response to a charging status signal received on bus 396 from battery charger 392, as shown in FIG. 3.

A docking connector 390 is included in wireless microphone controller 300 to provide a physical interface to wireless microphone 100 when it is docked to implement the synchronization feature of the invention. As noted above, a battery charger 392 is coupled to the docked wireless microphone 100 through the docking connector 390 which also includes a synchronization port 394.

When the two synchronization ports 294 (FIG. 2) and 394 are coupled during docking, a synchronization path is established between wireless microphone 100 and wireless microphone controller 300. A spreading code may then be selected and shared. For example, in this illustrative arrangement of the invention, a new spreading code is selected and shared between wireless microphone 100 and wireless microphone controller 300 during each docking event. That is, each time the wireless microphone 100 is docked with wireless microphone controller 300, controllers 210 and 310 select and share a spreading code.

In the case of frequency hopping, a pseudo-random list of channels is generated and the center frequency of the RF carrier is altered according to the list. In direct sequence, the phase of the RF carrier is shifted by a binary sequence that is generated in a pseudo-random manner. In both cases, the random-like properties used by the spreading method is termed pseudo-noise ("PN") sequences or codes. Thus, the PN code is duplicated and synchronized at the transmitter and receiver during docking. Later, when the wireless microphone 100 is un-docked from the wireless microphone controller 300, the RF receiver 364 in wireless microphone controller 300, using the same spreading sequence to follow the transmitter, moves from channel to channel (in a frequency hopping scheme) or follows the same binary sequence (in a direct sequence scheme) in lock-step with the RF transmitter 262 in wireless microphone 100.

In a similar manner, the RF receiver 264 in wireless microphone 100 locks with the RF transmitter 362 in wireless microphone controller 300 as both receiver and transmitter follow the same spreading sequence. Non-spread signals that do not bear the shared PN code are rejected by the RF receiver 264 in wireless microphone 100 to ensure that it is not inadvertently activated by an undesired or stray RF signal.

Figure 4:
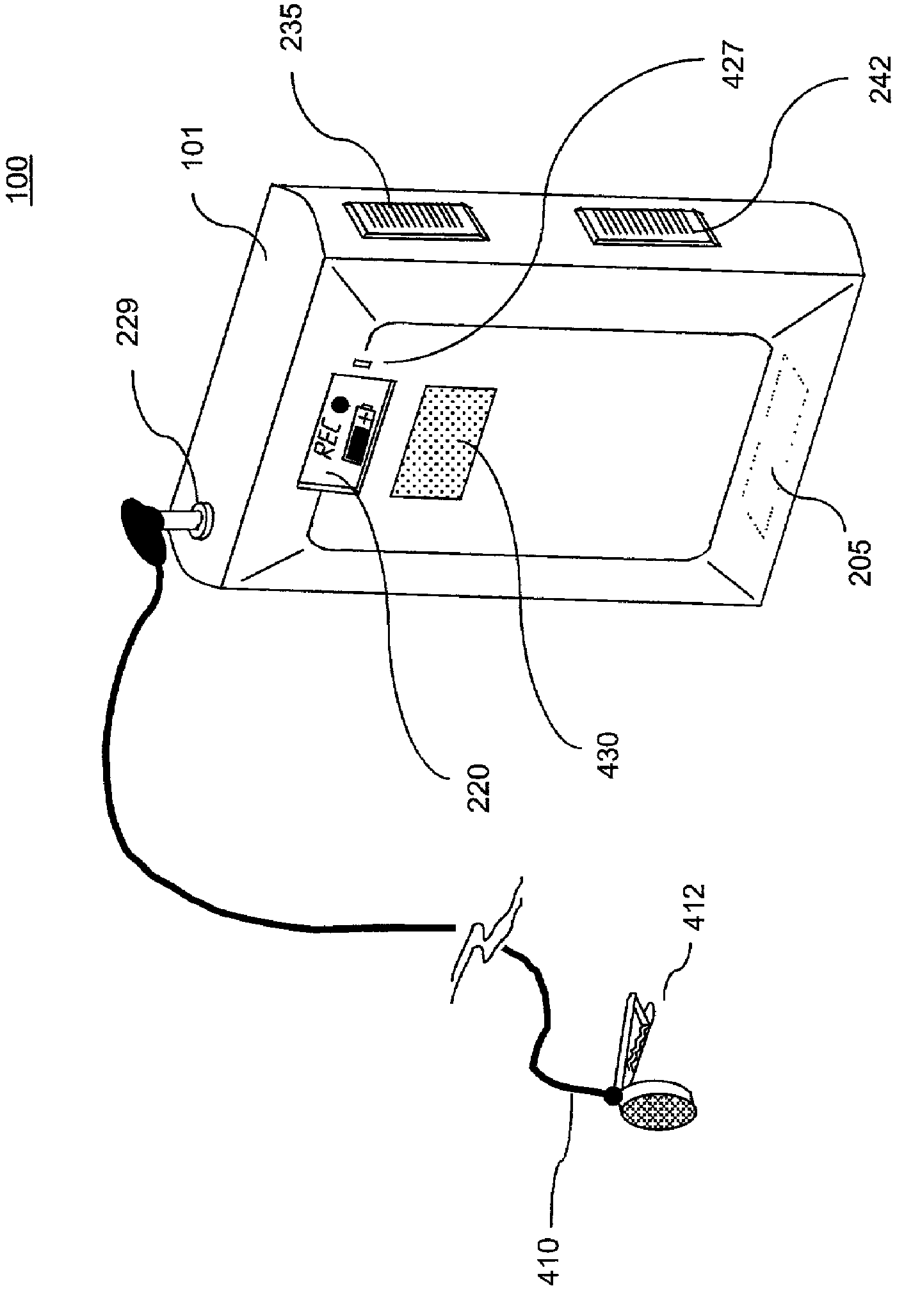
FIG. 4 is a pictorial representation of an illustrative embodiment of a wireless microphone equipped with bi-directional RF communications capability, in accordance with the invention.
Figure 5:
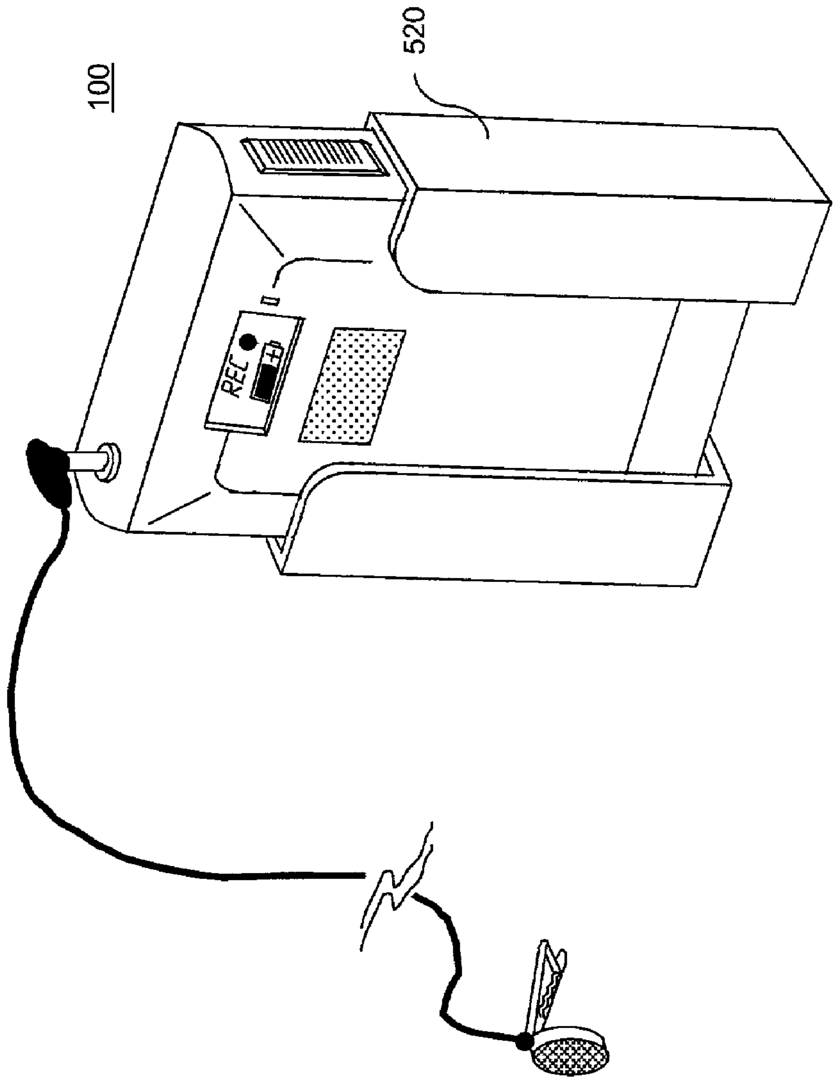
FIG. 5 is a pictorial representation of a wireless microphone inserted into a duty belt holster, in accordance with the invention.
Figure 7:
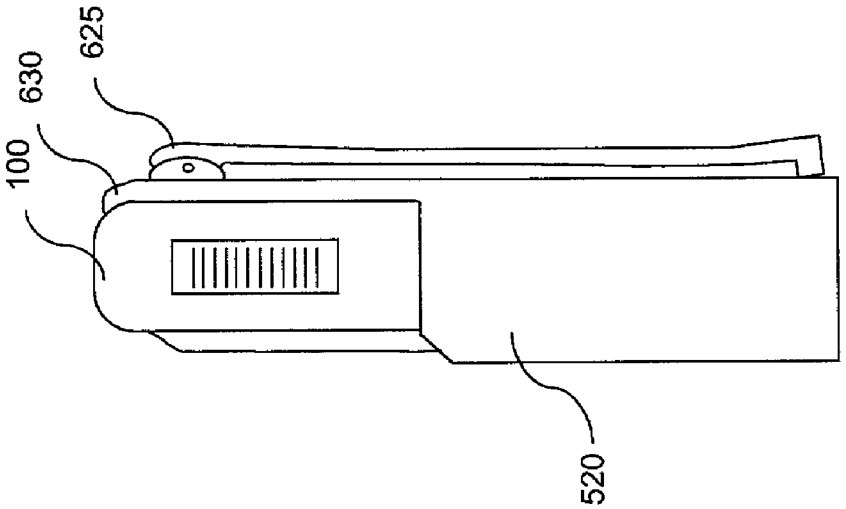
FIG. 7 shows a side view of the belt holster with wireless microphone inserted therein.
Figure 6:
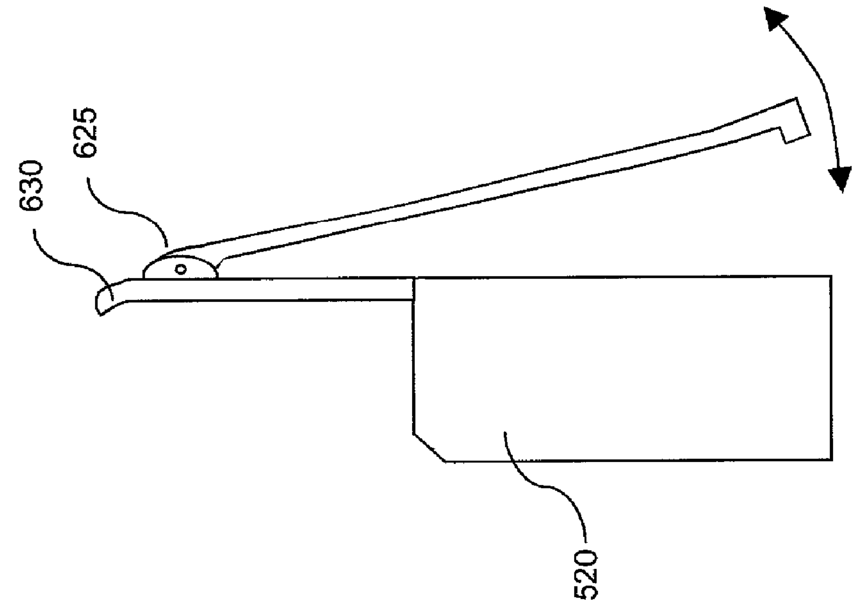
FIG. 6 is a side pictorial view of the belt holster shown in FIG. 5 depicting a hinged retainer clip.

FIG. 4 is a pictorial representation of an illustrative embodiment of a wireless microphone 100 equipped with bi-directional RF communications capability, in accordance with the invention. Wireless microphone 100 in this illustrative embodiment is configured as a compact unit (slightly larger than a typical pager) that is well suited to be comfortably worn on the body of an officer, for example, clipped to the officer's duty or gun belt. Accordingly, a belt clip (not shown in FIG. 4) may be integrated with the external housing 101 of the wireless microphone, or as shown in FIGS. 5–7, wireless microphone 100 may be removably inserted into a fitted "holster" 520 which is equipped with a moveable spring-type belt clip 625 (FIGS. 6 and 7).

Advantageously, the holster 520 allows an officer to reserve a space for the wireless microphone 100 on his or her typically crowded duty belt. The holster 520 may be semi-permanently attached to the belt with clip 625 (FIGS. 6 and 7) and the wireless microphone 100 may be slipped in and out as required to dock or recharge it. As shown in FIGS. 6 and 7 a small contoured lip 630 extends from the rear of the holster 520 to engage a corresponding contour on the wireless microphone 100 to keep it securely contained. A small amount of elastic deflection on the lip 630 thus occurs during insertion and withdrawal of the wireless microphone 100.

Returning back to FIG. 4, an external lavaliere microphone 410 and clothing clip 412 is shown being coupled to the external microphone interface 229 (FIG. 2). As described above, the external microphone 410 may be used in a complementary or "back-up" microphone to an internal microphone 227 (FIG. 2) that is arranged to pick up audio through a small aperture 427 in housing 101, as shown in FIG. 4. Audible alert generator 230 (FIG. 2) is located behind a grill 430 which may comprise an array of small apertures in housing 101.

Talk switch 235 and power switch 242 (FIG. 2) are externally disposed on housing 101 as shown in FIG. 4. LCD display 220 (FIG. 2) is located on wireless microphone 100 in an area that provides for ready viewing. It is emphasized that the location of the various elements and the physical design of the housing 101 depicted in FIG. 4 are merely illustrative, and that invention contemplates that a wide variety of designs and arrangements of such elements may be readily tailored to the specific requirements of each application. For example, it may be desirable in some applications of the invention to orient the LCD display 220 to the top face of wireless microphone 100 (and thus be co-planar with the external microphone interface 229 shown in FIG. 4).

Figure 9:
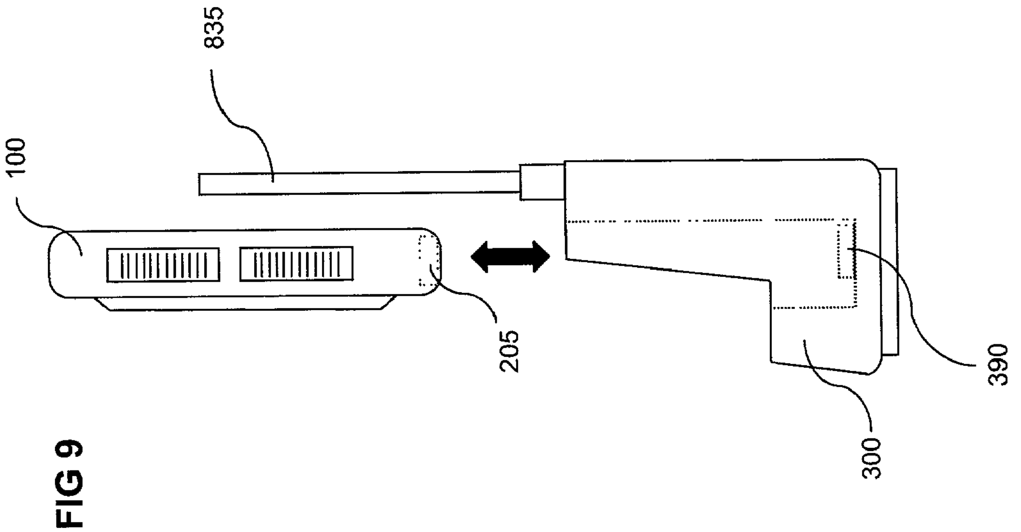
FIG. 9 is a side pictorial view of the wireless microphone controller depicting the docking feature of the wireless microphone and controller, in accordance with the invention.
Figure 8:
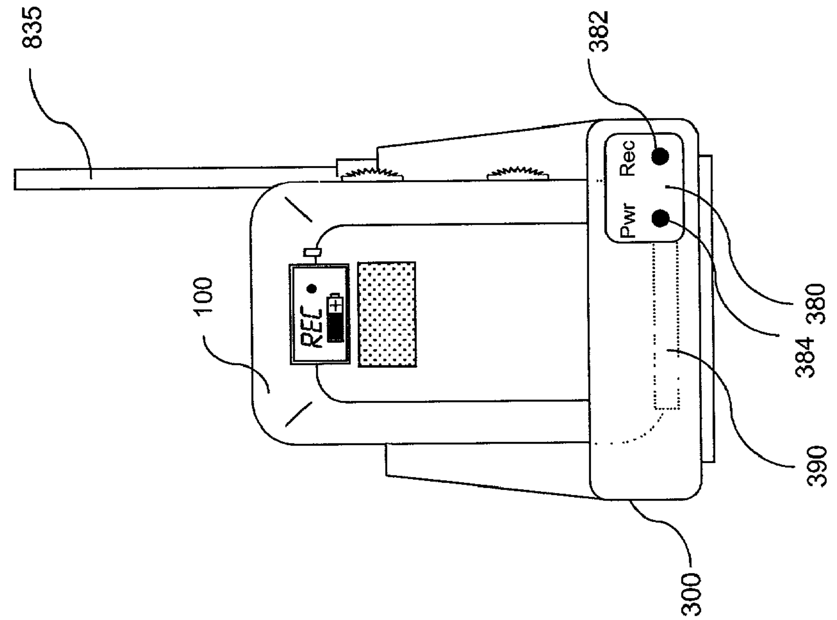
FIG. 8 shows a front pictorial representation of the wireless microphone inserted in the wireless microphone controller in a docking configuration, in accordance with the invention.

FIGS. 8 and 9 show front and side pictorial representations of the docking feature of the wireless microphone 100 and wireless microphone controller 300, in accordance with the invention. Referring to FIG. 8, the wireless microphone controller 300 may be physically embodied as shown with an area arranged to receive the wireless microphone 100. The receiving area is sized to be close fitting to the wireless microphone 100 and further includes the docking connector 390 (FIG. 3) disposed along the lower interior surface so that the corresponding docking connector 205 on wireless microphone 100 mechanically and electrically engage when the units are docked.

It is emphasized that the specific locations of the connectors is merely illustrative, and that other arrangements may be used. For example, while a downward insertion action is shown in FIG. 9 to accomplish docking via a connector on the bottom surface of the wireless microphone 100, it may be desired in some applications to provide an configuration where the wireless microphone is coupled on a side or top surface. In addition, the male/female engagement roles may be reversed so that the wireless microphone 100 is arranged with a receiving space that accepts the insertion of an appropriately configured microphone controller docking interface.

FIGS. 8 and 9 show an exterior antenna 835. As noted above, the use of an exterior antenna is optional depending on the requirements of the application. FIG. 8 also shows the indicator LED 380 shown in FIG. 3 and described in the accompanying text. The power indicator 384, as noted above, indicates that the wireless microphone controller 300 is powered up. However, it may also be desirable to have a visual indicator of the charging status of battery 247 (FIG. 2) when the wireless microphone 100 is docked. The battery charger 392 (FIG. 3) includes circuitry that can sense the current take-up and/or voltage of the battery 247 and sends an appropriate signal to indicator 380. For example, a color coding scheme may be used to indicate that the battery is charging, charging is near completion, and that the battery is fully charged, where red, amber, and green indicators are used, respectively. This same circuitry may also be used to regulate the current provided to the battery 247 by the charger 392 to ensure that the battery 247 is not overcharged.

Figure 10:
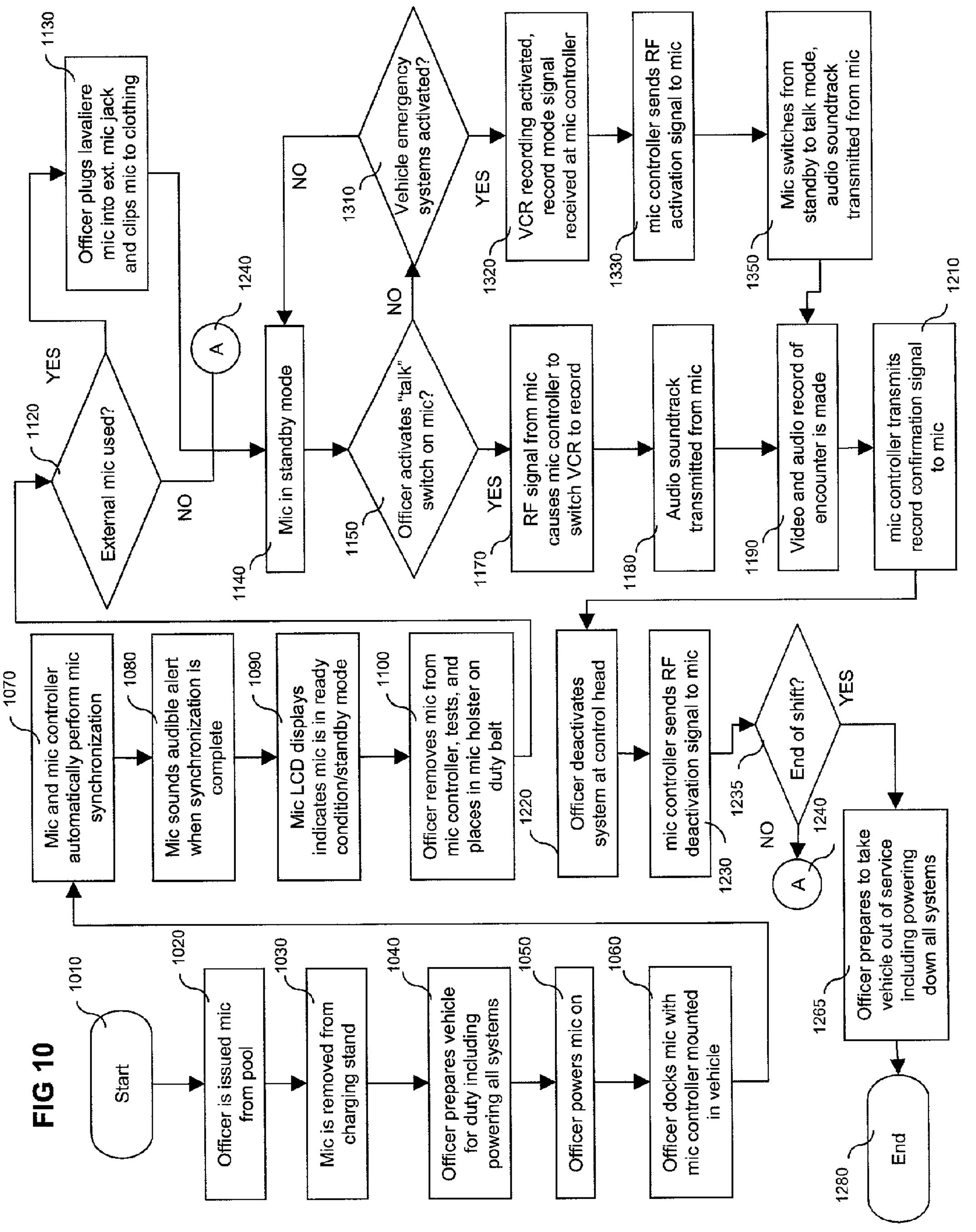
FIG. 10 is a flowchart illustrating a method of operating an in-car video system with the wireless microphone and wireless microphone controller of the present invention.

FIG. 10 is a flowchart illustrating an exemplary method of operating the in-car video system 110 with the wireless microphone 100 and wireless microphone controller 300 of the present invention. The method starts at block 1010. At block 1020, an officer is issued a wireless microphone 100 from a pool of microphones that may be kept in charging stands as indicated in block 1030 to keep the battery 247 fresh. As described above, the present invention allows the officer to take any microphone from the pool without concern about matching the transmitter to the in-car receiver to enable secure communications.

As shown in block 1040, the officer prepares vehicle 175 for duty, which typically includes a check of major systems including emergency systems such as lights and siren, as well as powering on communications equipment such as radio and mobile data communications. At this time, the in-car video system 110 is powered-on and the power indicator 384 (FIG. 8) is activated to indicate to the officer that the wireless microphone controller 300 is powered up and ready for docking to implement the synchronization process.

The officer switches the wireless microphone 100 on using switch 242 (FIG. 2) as indicated in block 1050. LCD display 220 (FIG. 2) displays a battery icon to indicate the level of battery charge of battery 247 (FIG. 2). In addition, the wireless microphone may be optionally arranged to perform a self-diagnostic at power-up and display an indicator to the officer such as "READY TO DOCK". An audible alert may also be generated by audible alert generator 230 (FIG. 2) to indicate proper operation.

The wireless microphone 100 is next docked with wireless microphone controller 300 in block 1060 of FIG. 10. Upon docking, an alert tone is generated by audible alert generator 230 in wireless microphone 100 to indicate to the officer that the synchronization process has been effected. A corresponding visual alert may be optionally displayed on LCD display 220 on the wireless microphone. In addition, the power indicator 384 (FIGS. 3 and 8) may be arranged to confirm the status of battery 247 as described above in the text accompanying FIG. 8.

The inventive method continues at block 1070 with the synchronization process where the spreading code is selected and shared between wireless microphone 100 and wireless microphone controller 300. The length of the synchronization process may vary according the specific spreading methodology and controllers selected, however, typically the synchronization is completed within several seconds. At block 1080, the wireless microphone 100 may sound an audible alert using audible alert generator 230 to indicate that the synchronization process was successful. Similarly, the LCD display 220 may be arranged to provide a visual indicator to the officer that the synchronization is performed (e.g., by setting indicator 384 to intermittently flash during the synchronization process). Indicator 384 may use another pattern (e.g., going from flash to steady) to indicate that wireless microphone 100 is in a ready condition for use (i.e., is in standby mode), as shown in block 1090 in FIG. 10.

Moving next to block 1100, once the officer has confirmed proper operating condition of the wireless microphone 100 via the audible and/or visual indicators, the officer may test the operation of the wireless microphone by removing it from the wireless microphone controller 300 and briefly triggering the talk switch 235 (FIG. 2) to ensure that the VCR 120 starts recording. A visual confirmation that the VCR is recording is displayed on LCD display 220 and the record indicator 382 (FIG. 3) on wireless microphone controller should also confirm that VCR 120 is recording. Once the test is concluded, the officer affixes the wireless microphone 100 to an article of clothing, or places the wireless microphone in the holster 520 that is clipped to the officer's duty belt. If an external microphone is used, then the external microphone is plugged into the external microphone interface 229 and then clipped to the officer's clothing such as tie or lapel, as shown in blocks 1120 and 1130 in FIG. 10.

The inventive method moves to block 1140 where the wireless microphone 100 is powered on, but in standby mode awaiting either manual or automatic activation at the appropriate time. Should the officer manually activate the wireless microphone 100 by actuating the talk switch 235 (FIG. 2), as shown in decision block 1150, the transmitted RF signal is received at the wireless microphone controller which triggers the issuance of command signal 348 (FIG. 3) to start VCR 120 (FIG. 1) recording, as shown in block 1170. VCR 120 records the audio soundtrack captured and transmitted by the wireless microphone 100 at block 1180 in a spread spectrum RF transmission stream. VCR 120 will simultaneously record the images captured by camera 150 (FIG. 1), thus creating an evidentiary record, including video and accompanying audio soundtrack, as shown in block 1190. At block 1210, the wireless microphone controller 300 transmits a confirmation to the wireless microphone 100 that the VCR is recording. The wireless microphone 100 displays the confirmation on the LCD display 220 (FIG. 2) and may sound an audible alert using audible alert generator 230 (FIG. 2) as an additional record confirmation.

If at decision block 1150, a manual activation has not occurred, then other in-car video system activations are evaluated at decision block 1310. For example, with in-car video systems that are configured to automatically activate when the vehicle's emergency systems are switched on, the officer may switch on the overhead lights 180 (FIG. 1) in vehicle 175 to initiate a traffic stop, or during an emergency situation or citizen encounter. VCR 120 will then record the images captured by camera 150 (FIG. 1). The VCR recording indicative signal is received on line 346 by wireless microphone controller 300 when the VCR begins recording as indicated in block 1320 in FIG. 10. At block 1330, the wireless microphone controller 300 sends the RF activation signal to the wireless microphone 100 to automatically switch it from standby mode to "talk" mode where audio is captured by the microphone and then transmitted back to the wireless microphone controller 300 in a spread spectrum RF transmission stream, as shown in block 1350. As with the manual activation described above, wireless microphone controller 300 transmits a VCR record confirmation to wireless microphone 100.

At the end of the encounter, traffic stop or emergency condition, as shown in block 1220 the officer deactivates the in-car video system 110 using the "STOP" or "POWER" switches on the VCR control head 135. Once the in-car video system 110 is deactivated by the VCR control head 135, VCR 120 stops recording and the wireless microphone controller 300 sends an RF deactivation signal to wireless microphone 100 to switch it from "talk" mode to standby mode, as shown in block 1230. It is noted that this illustrative embodiment of the invention is arranged to allow wireless microphone 100 deactivation solely via an affirmative press of the "STOP" or "POWER" switches on VCR control head 135. Accordingly, and as described above in the text accompanying FIG. 2, the user-operable talk switch 235 (FIGS. 2 and 4) on wireless microphone 100 is used only to switch wireless microphone 100 to "talk" mode, but not from "talk" mode to standby mode. This arrangement advantageously ensures that the audio soundtrack is fully continuous with the video being recorded and no audio drop outs occur if the talk switch 235 on the wireless microphone is actuated (for example, by contact during some physical interaction between an officer and a suspect).

As shown in FIG. 10, the inventive method may repeat at block 1235 or the officer may power down the in-car video system 110 as shown in block 1265 when going out of service. The method ends at block 1280.

Other features of the invention are contained in the claims that follow.

What is claimed is:

1. A vehicle-mounted base station for use in a vehicle-mounted surveillance system including a video recording device and for use with a wireless microphone, the wireless microphone being operational-mode switchable in response to an RF activation signal, comprising:

an input coupled to receive an operational status signal from the video surveillance system indicative of an operational status of the video recording device;

a controller coupled to the input to receive the operational status signal and for generating an RF activation signal when the operational status signal indicates that the video recording device is in recording mode; and an RF transmitter arranged for transmitting the RF activation signal to the wireless microphone to switch the wireless microphone into a transmit mode from a standby mode.

2. The vehicle-mounted base station of claim 1 including a visual indicator for indicating of a state of battery charge of a battery disposed within the wireless microphone.

3. The vehicle-mounted base station of claim 1 including a visual indicator for indicating a successful exchange of a security code between the wireless microphone and the vehicle-mounted base station.

4. The vehicle-mounted base station of claim 1 wherein the video recording device is selected from the group consisting of tape recorders, video cassette recorders, hard-disk drives, electronic memory, or optical drives.

5. The vehicle-mounted base station of claim 1 wherein the RE transmitter transmits using a digital spread spectrum transmission technique.

6. The vehicle-mounted base station of claim 5 wherein the digital spread spectrum transmission technique is selected from the group consisting of frequency hopping or direct sequence.

7. A method of operating a vehicle-mounted base station for use in a vehicle-mounted video surveillance system including a video recording device and for use with a bi-directional wireless microphone, the bi-directional wireless microphone being operational mode-switchable in response to an RF activation signal, the method comprising the steps of:

receiving an operational status signal from the video surveillance system indicative of an operational status of the video recording device; and generating an RF activation signal when the operational status signal indicates that the video recording device is in recording mode;

transmitting the RF activation signal to the bi-directional wireless microphone to switch the wireless microphone into an audio transmission mode.

8. The method of claim 7 including the further step of indicating a state of battery charge of a battery disposed within the wireless microphone.

9. The method of claim 7 including the further step of indicating a successful exchange of a security code between the wireless microphone and the vehicle-mounted base station.

10. The method of claim 7 including the step of automatically placing the video recording device into the recording mode upon actuation of an emergency system of the vehicle.

11. The method of claim 7 wherein the video recording device is selected from the group consisting of tape recorders, video cassette recorders, hard-disk drives, electronic memory, or optical drives.

* * * * *

UNITED STATES PATENT AND TRADEMARK OFFICE

CERTIFICATE OF CORRECTION

PATENT NO. : 7,119,832 B2
APPLICATION NO. : 09/911086
DATED : October 10, 2006
INVENTOR(S) : Louis W. Blanco et al.

It is certified that error appears in the above-identified patent and that said Letters Patent is hereby corrected as shown below:

Drawings, Sheet 2 of 8, delete reference numeral 274 and its associated lead line, and the instance of reference numeral 296 that is below and to the left of reference numeral 274 and its associated lead line.

Col. 3, Line 21, after “police”, change “department” to -- departments -- .

Col. 3, Line 27, after “in-car”, change “video equipped” to -- video-equipped -- .

Col. 4, Line 20, before “camera”, change “windshield mounted” to --windshield-mounted -- .

Col. 4, Line 36, before “secure”, insert -- a --.

Col. 4, Line 49, before “magnetic”, insert -- as -- .

Col. 5, Line 32, after “microphone”, insert -- 100 -- .

Col. 5, Line 14, after “and”, change “controls” to -- control --.

Col. 6, Line 1, after “including”, change “light emitting” to -- light-emitting -- .

Col. 6, Line 6, after “information”, change “relation” to -- relating-- .

Col. 6, Line 19, after “microphone”, insert -- , -- .

Col. 6, Line 19, after “which”, change “include” to -- includes -- .

Col. 6, Line 42, after “may”, delete -- be --.

Col. 6, Line 52, before “charge”, delete--of -- .

Col. 7, Line 22, after “provide”, change “a” to -- an -- .

Col. 8, Line 49, before “provide”, insert --to -- .

Col. 9, Line 11, after “method”, change “is” to -- are --.

Col. 10, Line 4, before “invention”, insert --the -- .

UNITED STATES PATENT AND TRADEMARK OFFICE
CERTIFICATE OF CORRECTION

PATENT NO. : 7,119,832 B2
APPLICATION NO. : 09/911086
DATED : October 10, 2006
INVENTOR(S) : Louis W. Blanco et al.

It is certified that error appears in the above-identified patent and that said Letters Patent is hereby corrected as shown below:

Col. 10, Line 18, after "be", change "close fitting" to -- close-fitting-- .

Col. 10, Line 29, after "provide", change "an" to -- a -- .

Col. 10, Line 47 - 48, before "scheme" (line 48), change "color coding" to -- color-coding --.

Col. 11, Line 31, after "according", insert -- to --.

Col. 11, Line 61, before "tie", insert -- his/her -- .

Claim 1, Col. 13, line 5, after "being", change "operational-mode switchable" to -- operational mode-switchable --.

Claim 2, Col. 13, Line 19, after "indicating", delete -- of --.

Claim 5, Col. 13, Line 30, before "transmitter", change "RE" to -- RF -- .

Signed and Sealed this

Tenth Day of April, 2007

JON W. DUDAS
*Director of the United States Patent and Trademark Office*